(12) United States Patent
Mishimagi

(10) Patent No.: US 6,880,960 B2
(45) Date of Patent: *Apr. 19, 2005

(54) SIDE MIRROR COVER AND SIDE MIRROR BODY

(75) Inventor: Kazuharu Mishimagi, Tokyo (JP)

(73) Assignee: E'Sam Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/616,072

(22) Filed: Jul. 9, 2003

(65) Prior Publication Data

US 2004/0190303 A1 Sep. 30, 2004

(30) Foreign Application Priority Data

Mar. 26, 2003 (JP) ........................................ 2003-084600

(51) Int. Cl.[7] ............................................... F21V 5/00
(52) U.S. Cl. ....................... 362/522; 362/494; 362/511; 362/548
(58) Field of Search ................................ 362/522, 494

(56) References Cited

U.S. PATENT DOCUMENTS 5,499,169 A * 3/1996 Chen .......................... 362/494

* cited by examiner

Primary Examiner—John Anthony Ward
Assistant Examiner—Jason Han
(74) Attorney, Agent, or Firm—Reed Smith LLP

(57) ABSTRACT

A side mirror cover comprises a mirror plate covering member and a side mirror lamp. The lamp comprises a lamp housing having a plurality of light emitting elements and a translucent lamp cover for covering the light emitting elements. A through hole comprises first and second through holes formed side by side along the width of the vehicle. A lamp housing comprises first and second housing sections. The lamp cover comprises first and second cover sections. A plurality of light emitting elements comprises a first LED for illuminating the front of the vehicle and a second LED for illuminating the side of the vehicle. The inner surface of the first cover section has concavities and convexities so as to reflect light. Two types of side mirror lamps are clearly differentiated so that a function as a direction indicator lamp and a function as a position lamp or a daytime lamp are provided.

10 Claims, 8 Drawing Sheets

SIDE MIRROR COVER AND SIDE MIRROR BODY

CROSS-REFERENCES TO RELATED APPLICATIONS

This application claims priority of Japanese Application No. 2003-084600 filed Mar. 26, 2003, the complete disclosure of which are hereby incorporated by reference.

BACKGROUND OF THE INVENTION

1. Field of the Invention

The present invention relates to a side mirror cover for covering a side mirror body provided projectingly from the side of the vehicle, and a side mirror body.

2. Description of the Related Art

Heretofore, a vehicle is provided with sideways projecting side mirrors on both sides of the vehicle body as well as a room mirror provided in the interior of the vehicle for a driver to look behind for traffic. These mirrors ensure that the driver has a clear view to the rear of the vehicle without turning his/her head toward the rear. Although the room mirror and the side mirror are standardized according to the type of vehicle, the side mirror being partly responsible for the appearance of vehicle are figured to satisfy the sense of beauty. The side mirrors for passenger vehicles are mainly mounted on the doors, and figured to satisfy the sense of beauty considering the total appearance of vehicle. Further, there is a need for ornate side mirrors depending on the taste of consumers because of recent diversification of the taste of the consumers.

At the front end of the vehicle, there are provided position lamps for allowing oncoming cars or the third parties walking on the street to recognize the width of the vehicle at night as well as direction indicator lamps for indicating the turning directions of the vehicle and headlamps as an illuminating device for nighttime driving. The oncoming cars or the third parties walking on the street can recognize the width of the vehicle from the position lamps and the turning direction of the vehicle from flickering of the direction indicator lamp. The oncoming cars or the third parties walking on the street ensure the safety by driving or walking while avoiding contact with the vehicle.

On the other hand, since the position lamps in the related art are provided at the front end of the vehicle, there is a problem in that the width of the vehicle body at the front end of the vehicle can be recognized, but the width of the entire vehicle including the side mirrors cannot be recognized. In other words, since the side mirrors are provided on the vehicle body so as to project sideways from the vehicle body, the width of the entire vehicle including the side mirrors is larger than the width indicated by the position lamps. Therefore, the oncoming cars or the third parties walking on the street are required to estimate the width of the entire vehicle by adding the estimated amount of projection of the side mirrors to the width indicated by the position lamps. However, since the amount of projection differs depending on the type of vehicle, it is relatively difficult to estimate. Especially, such estimation is much more difficult in the case of vehicles having side mirrors that project sideways to a large extent from the vehicle body, such as heavy-duty trucks.

In order to solve these problems, a side mirror cover including a mirror cover body adapted to be capable of being mounted on the front surface of the side mirror body of the vehicle and a side mirror lamp mounted on the mirror cover body so as to be visible from the front of the vehicle is proposed (Japanese Patent No.3030021). When forming the covers into complex configurations, or coloring or plating on the side mirror covers, high value-added side mirror covers are achieved at a lower cost than the case of forming or processing the entire side mirror into such configurations, since such side mirror covers are adapted to be attached independently on the front surface of the side mirror body. Furthermore, when the side mirror lamps mounted on the mirror cover bodies are illuminated, the positions of the side mirrors are visible from the front, and thus the width of the entire vehicle including the side mirrors can be recognized.

However, since a plurality of the light emitting elements is aligned in a row and are covered with a single lamp cover in the side mirror lamp of the side mirror cover described above, the intended use of the side mirror lamp is disadvantageously limited to one or the other of the direction indicator lamp or the position lamp. In other words, when some of the plurality of the light emitting elements is used as a direction indicator lamp and the remainder of the light emitting elements are used as a position lamp, since the lamp cover is a single body, illumination of the light emitting elements for one of those usage is liable to be misidentified as illumination for the other usage, and thus the intended use cannot be clearly differentiated.

SUMMARY OF THE INVENTION

Accordingly, it is an object of the invention to provide a side mirror cover and a side mirror body in which two types of side mirror lamps can clearly be differentiated.

It is another object of the invention to provide the side mirror cover and the side mirror body having a function as a direction indicator lamp and a function as a position lamp or as a daytime lamp.

The first aspect of the invention is an improved side mirror cover including a mirror cover body, which is formed so as to cover the front surface of the side mirror body of a vehicle and is formed with a through hole having an outer end positioned at the widthwise end of the vehicle, and a side mirror lamp fitted from the backside of the mirror cover body into the through hole.

The characteristic construction of the side mirror cover is that the side mirror lamp comprises a lamp housing fitted along the peripheral edge of the through hole formed on the mirror cover body so as to close up the through hole and provided with a plurality of the light emitting elements, and a translucent lamp cover mounted on either one or both of the lamp housing and the mirror cover body so as to cover the plurality of the light emitting elements, in that the through hole comprises a first through hole and a second through hole, the lamp housing comprises a first housing section for closing up the first through hole and a second housing section for closing up the second through hole, the lamp cover comprises a first cover section facing the first housing section and a second cover section facing the second housing section, and the plurality of the light emitting elements comprises one or more first LED or LEDs provided in the second housing section and one or more second LED or LEDs provided in the first housing section.

The second aspect of the invention is an improved side mirror body including a mirror plate, a mirror plate covering member formed so as to cover the mirror plate, with the inner extremity attached to the front end of an opening on a vehicle door for accommodating side window glass at an end thereof, and is provided with a through hole having the outer end positioned at the widthwise end thereof, and a side mirror lamp mounted from the backside of the mirror plate covering member into the through hole.

The characteristic construction of the side mirror body is that the side mirror lamp comprises a lamp housing fitted along the peripheral edge of the through hole formed on the mirror plate covering member so as to close up the through hole and provided with a plurality of light emitting elements, and a translucent lamp cover mounted on either one or both of the lamp housing and the mirror plate covering member so as to cover the plurality of the light emitting elements, in that the through hole comprises a first through hole and a second through hole, the lamp housing comprises a first housing section for closing up the first through hole and a second housing section for closing up the second through hole, the lamp cover comprises a first cover section facing the first housing section and a second cover section facing the second housing section, and a plurality of the light emitting elements comprises one or more first LED or LEDs provided in the second housing section and one or more second LED or LEDs provided in the first housing section.

According to the side mirror cover and the side mirror body, the light emitted from one or more first LED or LEDs passes through the second cover section of the lamp cover and emitted outwardly of the vehicle, and the light emitted from one or more second LED or LEDs passes through the first cover section of the lamp cover and emitted outwardly of the vehicle. Therefore, for example, the second LED may be connected to the direction indicator lamp and the first LED may be used as a position lamp. In this case, since the first LED and the second LED are provided in the through holes formed separately, illumination of one LED cannot be confused with illumination of the other LED, and thus the function as a direction indicator lamp and the function as a position lamp or as a daytime lamp are achieved.

DESCRIPTION OF THE PREFERRED EMBODIMENTS

Figure 1:
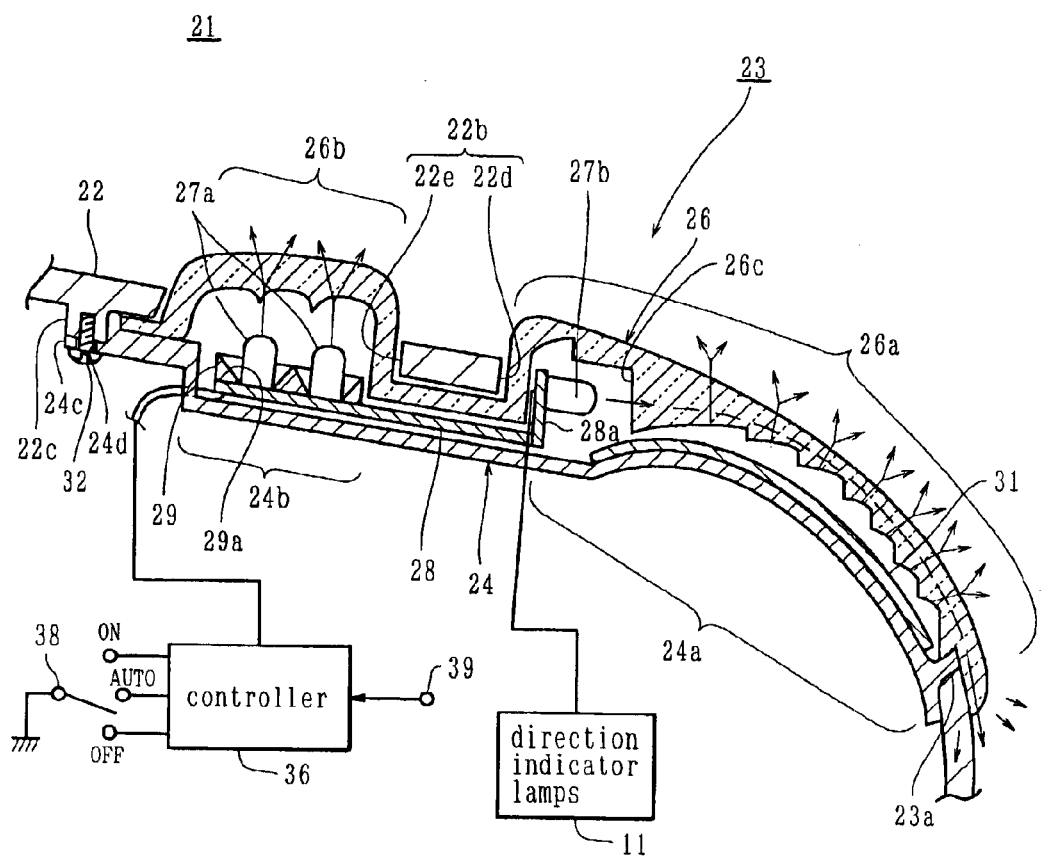
FIG. 1 is a cross sectional view of a side mirror cover of the invention taken along the line B—B in FIG. 3.

Referring now to the drawings, embodiments of the invention will be described in detail.

Figure 4:
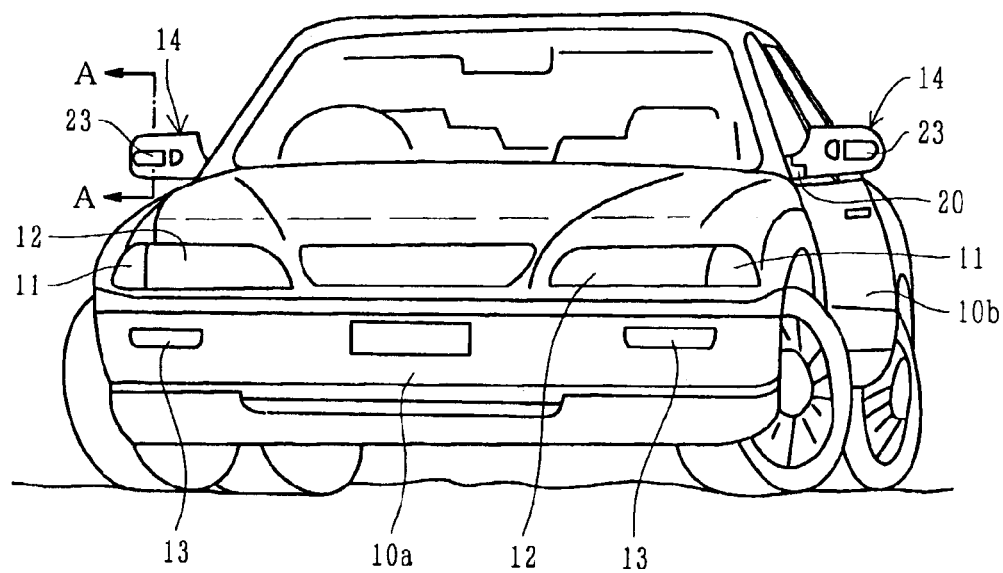
FIG. 4 is a front view of a vehicle on which the vehicle side mirror is mounted.

As shown in FIG. 4, a vehicle 10 is provided with direction indicator lamps 11, 11 for indicating the turning direction of the vehicle 10 and the head lamps 12, 12 as a illuminating device for nighttime driving at the front end on both sides respectively, and a bumper 10a mounted below the head lamps is provided at both ends thereof with position lamps 13, 13 for allowing the oncoming cars or the third parties walking on the street to recognize the width of the vehicle 10 at night, respectively. The vehicle 10 in this embodiment is so called passenger car in the sedan category, and is adapted in such a manner that the oncoming cars or the third parties walking on the street can recognize the width of the vehicle 10 by the position lamps 13, 13. Doors 10b on both side of the vehicle 10 are provided with sideways projecting vehicle side mirrors 14, 14 respectively thereon. These side mirrors 14, 14 are fabricated to be symmetrical and ensure that the driver has a clear view to the rear of the vehicle 10 without turning his/her head owing to these side mirrors 14, 14.

Figure 3:
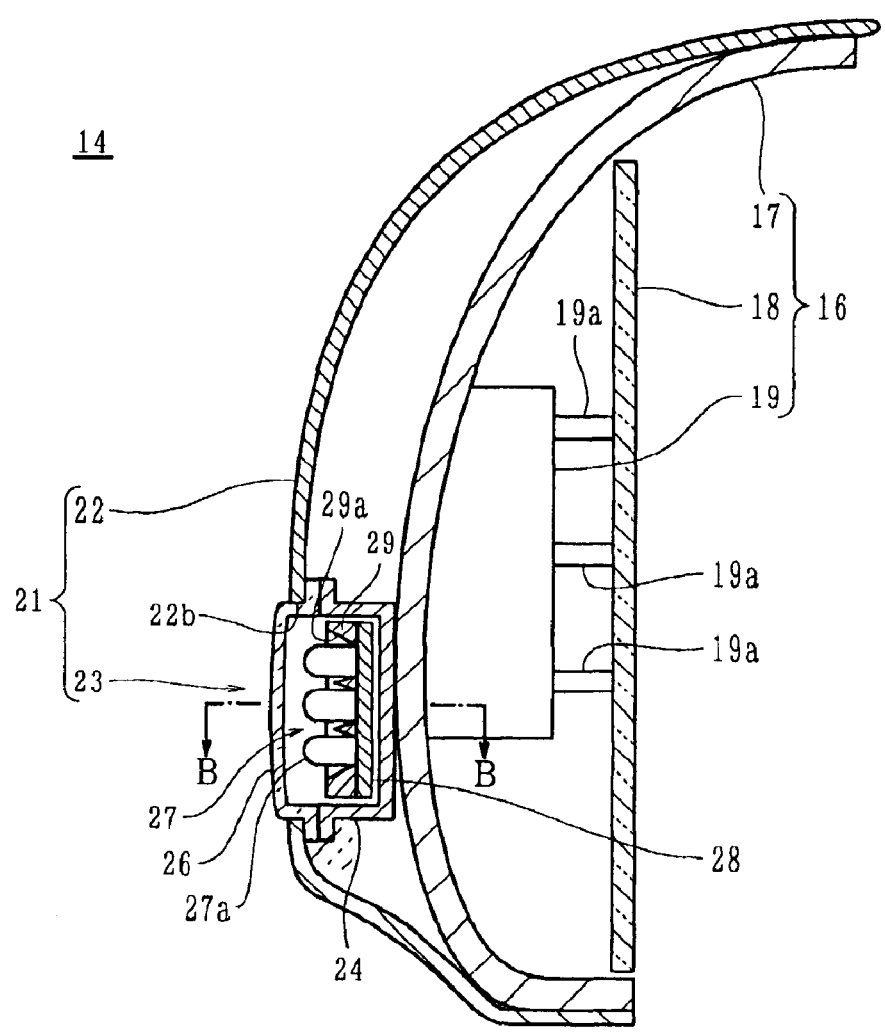
FIG. 3 is a cross sectional view of a vehicle side mirror with the cover mounted on a side mirror body, taken along the line A—A in FIG. 4.

The side mirror 14 on the driver side will be described as an example. As shown in FIG. 3, the vehicle side mirror 14 comprises the side mirror body 16 and a side mirror cover 21, and a side mirror body 16 comprises a mirror plate covering member 17, a mirror plate 18, a tilting device 19, and the supporting member 20 (FIG. 4). The mirror plate 18 is mounted on the mirror plate covering member 17 with the light-reflecting surface faced rearwardly of the vehicle, so that the light coming from the rear of the vehicle may be reflected toward the driver. The mirror plate 18 is mounted on the mirror plate covering member 17 via the tilting device 19, and the mirror plate covering member 17 is rotatably mounted to the supporting member 20 provided at the front end of the opening on a door of the vehicle 10 for side window glass at an end thereof (FIG. 4). The supporting member 20 enables the mirror plate covering member 17 to be folded toward the side window glass on the door 10b of the vehicle.

According to this embodiment, the mirror plate covering member 17 is curved out at the substantially center thereof toward the front of the vehicle so as to cover the mirror plate 18, and the tilting device 19 is mounted inside the curved-out mirror plate covering member 17. The tilting device 19 comprises a plurality of supporting rods 19a that move in the fore-and-aft direction of the vehicle by a motor, not shown, integrated therein, and the mirror plate 18 is mounted on the distal ends of the plurality of supporting rods 19a. The tilting device 19 is capable of tilting the mirror plate 18 with respect to the perpendicular direction or the direction of the width of the vehicle by moving the respective supporting rods 19a independently.

Figure 2:
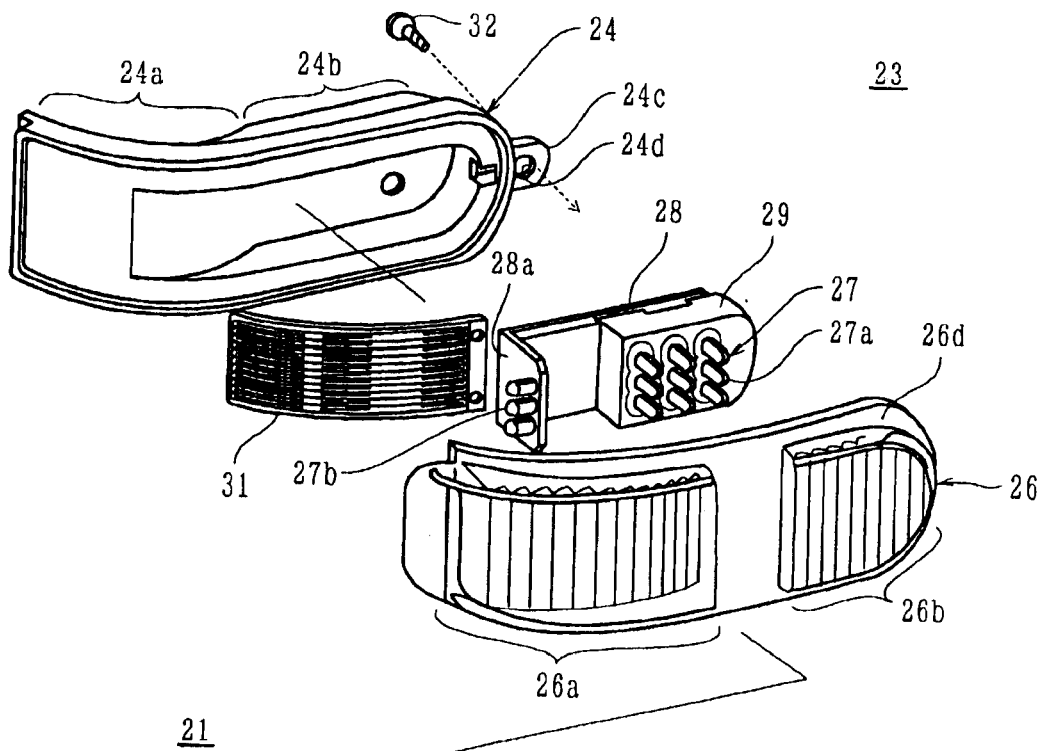
FIG. 2 is an exploded perspective view showing the side mirror cover.
Figure 2:
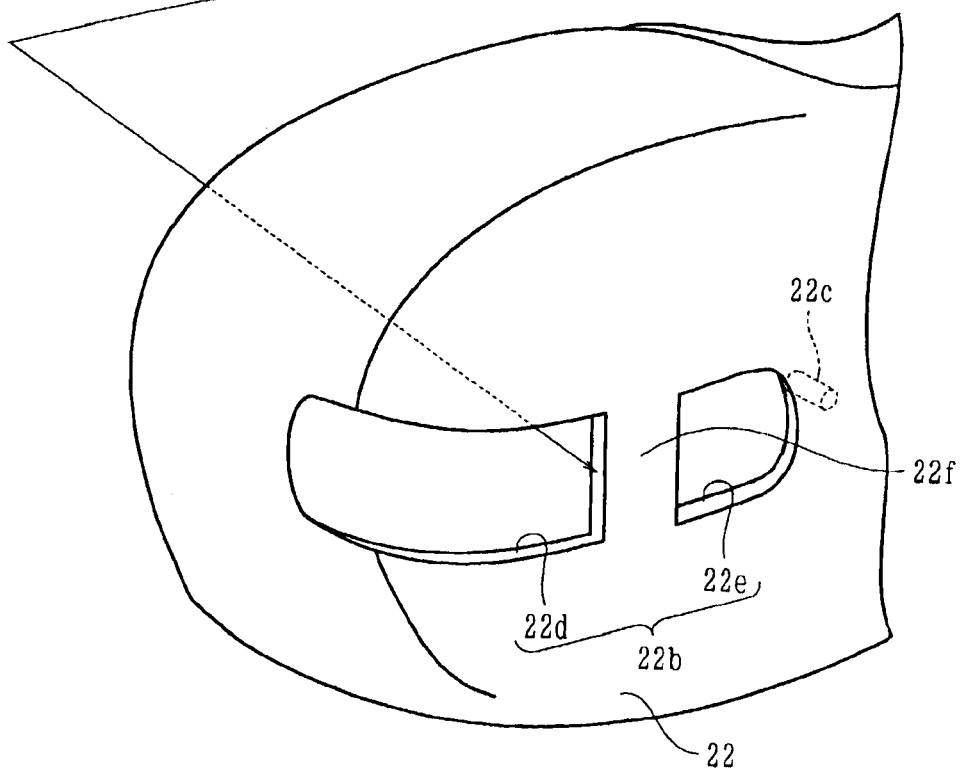

The side mirror cover 21 comprises a mirror cover body 22 formed so as to cover the front surface of the side mirror body 16, and a side mirror lamp 23 mounted from the backside of the mirror cover body 22. The mirror cover body 22 in this embodiment is formed by molding resin, and formed to curve out toward the front of the vehicle at the substantially center thereof corresponding to the configuration of the mirror plate covering member 17 so as to cover the mirror plate covering member 17 from the front surface. The mirror cover body 22 is provided with a laterally elongated through hole 22b extending along the widthwise direction of the vehicle and having the outer end at the extremity of the mirror cover body 22 (FIG. 2). The mirror cover body 22 is adapted to be capable of being mounted on the front surface of the side mirror body 16 by covering the mirror cover body 22 applied with a double-faced adhesive tape, not shown, on the inner surface thereof on the mirror plate covering member 17 from the front.

As shown in FIG. 1 to FIG. 3, the side mirror lamp 23 is fitted into the through hole 22b from the backside of the mirror cover body 22, and comprises a lamp housing 24 and a lamp cover 26. The lamp housing 24 is mounted on the mirror cover body 22 along the peripheral edge of the through hole 22b so as to close up the through hole 22b, and the lamp cover 26 is formed by molding translucent resin. The lamp housing 24 is provided with a plurality of the light emitting elements 27, and the lamp cover 26 covers these plurality of the light emitting elements 27 and is mounted on one or both of the lamp housing 24 and the mirror cover body 22.

As shown in FIG. 1, the through hole 22b comprises a first through hole 22d and a second through hole 22e formed side by side along the width of the vehicle. In other words, a partitioning section 22f is formed between the first through hole 22d and the second through hole 22e. The lamp housing 24 comprises a curved first housing section 24a for closing up the first through hole 22d positioned at the widthwise extremity of the vehicle and a second housing section 24b formed continuously from the first housing section 24a for closing up the second through hole 22e, and the lamp cover 26 comprises a first cover section 26a facing the first housing section 24a and a second cover section 26b formed continuously from the first cover section 26a so as to face the second housing section 24b. The plurality of the light emitting elements 27 comprises one or more first LED or LEDs 27a provided in the second housing section 24b for emitting the light toward the front of the vehicle and one or more second LED or LEDs 27b provided in the first housing section 24a for emitting the light toward the side of the vehicle.

The first LED 27a in this embodiment is mounted on a base plate, which corresponds to a support 28, and stored in the lamp housing 24. The support 28 is provided with a first reflector 29 on the surface facing the lamp cover 26, and the lamp housing 24 is provided at the first housing section 24a with a second the light reflector 31 curved along the configuration thereof. As shown in FIG. 2 in detail, the first and second the light reflectors 29, 31 in this embodiment are resin molds and applied with metal plating on the surface thereof. Two or more first LEDs 27a may be inserted into the first reflector 29, in which a plurality of holes 29a that increases in diameter toward the lamp cover 26 are formed and the light emitted from the first LED 27a reflects on the metal plate applied on the inner surface of the holes 29a and is directed toward the second cover section 26b of the lamp cover 26.

On the other hand, the second LED 27b is mounted on an auxiliary plate 28a, and the auxiliary plate 28a is mounted to the support 28 at the end on the side far from the vehicle substantially orthogonally to the support 28. Accordingly, the second LED 27b is mounted on the first housing section 24a so as to emit the light toward the side of the vehicle, and the auxiliary plate 28a prevents the light emitted from the second LED 27b from directing toward the second housing section 24b. The first reflector 29 is mounted to the support 28 inwardly of the vehicle. The support 28 is exposed between the first reflector 29 and the auxiliary plate 28a. The exposed portion corresponds to the partitioning section 22f described above.

The second cover section 26b of the lamp cover 26 is formed with concavities and convexities on the inner surface thereof, and thus the light emitted from the first LED 27a is refracted by the concavities and convexities formed on the inner surface of the second cover section 26b, passed through the second cover section 26b, and emitted toward the front of the vehicle from the second cover section. On the other hand, the first cover section 26a of the lamp cover 26 is formed on the inner surface thereof with a projected portion 26c facing the second LED 27b, and the first cover section 26a is formed with concavities and convexities parallel with the vertical direction continuously in the direction of the width of the vehicle. Part of the light emitted from the second LED 27b and passed from the projected portion 26c through the inside of the lamp cover along the width of the vehicle toward the outer end thereof is reflected from the concavities and convexities formed on the inner surface of the first cover section 26a, and emitted from the first cover section toward the front and the side of the vehicle. On the other hand, remaining part of the light is emitted from the outer end of the first cover section 26a toward the rear of the vehicle.

The side mirror lamp 23 is fabricated by adhering the peripheral edge of the lamp cover 26 on the peripheral edge of the lamp housing 24 including the plurality of the light emitting elements 27 as described above by the use of adhesive agent, and formed with a recessed groove 23a defined by the outer end of the first housing section 24a and the outer end of the first cover section 26a in the adhered state, which is capable of being fitted on the peripheral edge of the first through hole 22d on the side far from the vehicle. The peripheral edge of the first cover section 26a except for the portion on the far side of the vehicle and the peripheral edge of the second cover section 26b are formed with a flange 26d. On the other hand, the second housing section 24b is formed with a flange 24c having a mounting hole 24d on the inner end thereof. Further, a boss 22c is formed on the peripheral edge of the second through hole 22e on the side closer to the vehicle. The side mirror lamp 23 is then mounted to the mirror cover body 22 by fitting the concave groove 23a on to the peripheral edge of the first through hole 22d on the side far from the vehicle, covering the flange 26d with the mirror cover body 22, and in this state, passing a screw 32 through the mounting hole 24d and screwing into the boss 22c.

As described above, the side mirror cover 21 is mounted to the front surface of the side mirror body 16 by covering the mirror cover body 22 applied with a double-faced adhesive tape, not shown, on the inner surface thereof on the mirror plate covering member 17 from the front. Therefore, the side mirror lamp 23 can be removed from the mirror cover body 22 only before the mirror cover body 22 is mounted on the mirror plate covering member 17. The second LED 27b of the side mirror lamp 23 is electrically connected to the direction indicator lamps 11 of the vehicle 10 in the state of being mounted on the side mirror body 16. In other words, a lead that is not shown in the figure and connected to the second LED 27b at one end thereof is wired in the interior of the vehicle 10 and is connected to the lead that supplies a power to the direction indicator lamps 11 of the vehicle 10 at the other end. Accordingly, when a power is supplied and the direction indicator lamp 11 is flickered, the lead, not shown, is also supplied with a power, and thus the plurality of the light emitting elements 27 is flickered.

On the other hand, the first LED 27a of the side mirror lamp 23 functions as a position lamp or as a daytime lamp. In other words, a control output of a controller 36 is connected to the first LED 27a. The controller 36 is provided with a control switch 38, and a detected output of a vehicle speed sensor 39 of the vehicle is connected thereto. The control switch 38 is capable of selecting ON, OFF, and AUTO terminals. The controller 36 illuminates the first LED 27a irrespective of the detected output of the vehicle speed sensor 39 when the control switch 38 is switched to the ON terminal, and turns off the first LED 27a irrespective of the detected output of the vehicle speed sensor 39 when the control switch 38 is switched to the OFF terminal. When the control switch 38 is switched to the AUTO terminal, the controller 36 turns on or off the first LED 27a based on the detected output of the vehicle speed sensor 39. In this embodiment, when the control switch 38 is switched to the AUTO terminal, the controller 36 turns off the first LED 27a when the detected output of the vehicle speed sensor 39 is zero, that is, when the vehicle speed sensor 39 detected that the vehicle is in the halted state, and turns on the first LED 27a when the detected output of the vehicle speed sensor 39 is the value other than zero, that is, when the vehicle body sensor 39 detected that the vehicle is in a traveling state.

Figure 5:
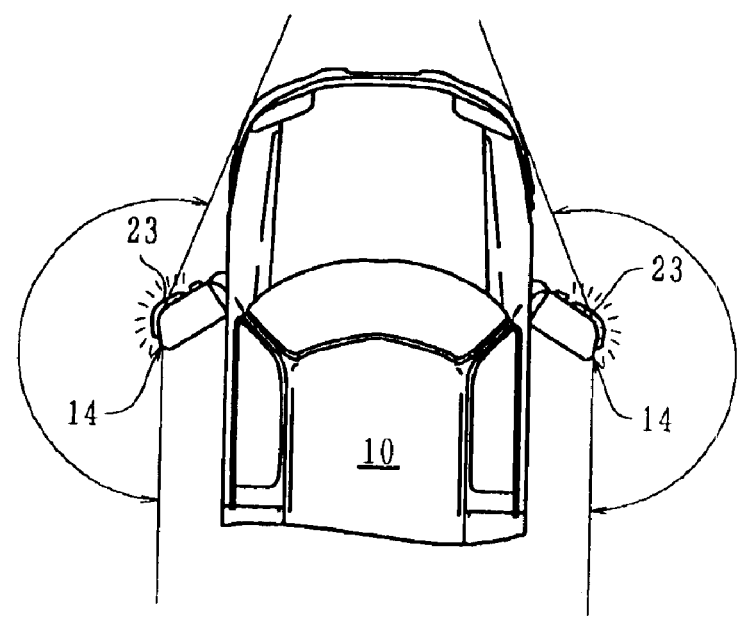
FIG. 5 is a drawing showing the range in which the lamp is visible.

In the vehicle side mirror 14 constructed as described above, when a driver of the vehicle 10 in FIG. 4 flickers the direction indicator lamp 11 before he or she turns the vehicle, the second LED 27b of the side mirror lamp 23 of the side mirror 14, which is electrically connected to the direction indicator lamp 11 and positioned at the outer most position of the vehicle 10, flickers. Light emitted from the second LED 27b passes from the projected portion 26c through the interior of the lamp cover 26 toward the outer end of the vehicle widthwise of the vehicle, and part of the light is reflected by the concavities and convexities formed on the inner surface of the first cover section 26a, and emitted from the first cover section toward the front and side of the vehicle. Accordingly, the turning direction of the vehicle can also be recognized by the third parties on the street on the side of the vehicle, or the driver in the vehicle approaching from the side at the junction. Light passing through the interior of the lamp cover toward the outer end widthwise of the vehicle is finally emitted from the outer end of the first cover section 26a toward the rear of the vehicle, and as shown in FIG. 5, illumination thereof can be recognized from relatively wide range of the surrounding area of the vehicle, whereby third parties walking on the street behind the vehicle or drivers of vehicles approaching the relevant vehicle from behind can recognize the turning direction of the relevant vehicle, and the drivers of the vehicles and the third parties on the street can effectively avoid contact with the vehicle 10, thereby ensuring a sufficient safety.

On the other hand, when the control switch 38 is switched to the ON terminal or to the AUTO terminal, the controller 36 turns on the first LED 27a of the side mirror lamp 23 of the side mirror 14 constantly or during traveling. Light emitted from the first LED 27a is reflected directly or via the first reflector 29, refracted by the concavities and convexities formed on the inner surface of the second cover section 26b of the lamp cover 26, passes through the second cover section 26b, and emitted from the second cover section toward the front of the vehicle. Accordingly, the light emitted from the first LED 27a functions as a position lamp at night, and as so-called daytime lamp in the daytime, so that oncoming vehicles approaching from the front of the vehicle can recognize the existence of the relevant vehicle. In addition, decorative effect of the vehicle may be enhanced. When the control switch 38 is switched to the AUTO terminal, the controller 36 turns off the first LED 27a when the vehicle is stopped, and reduces the quantity of power consumption. By turning the control switch 38 to the OFF terminal, the first LED 27a may be constantly turned off at the driver's desire.

Figure 6:
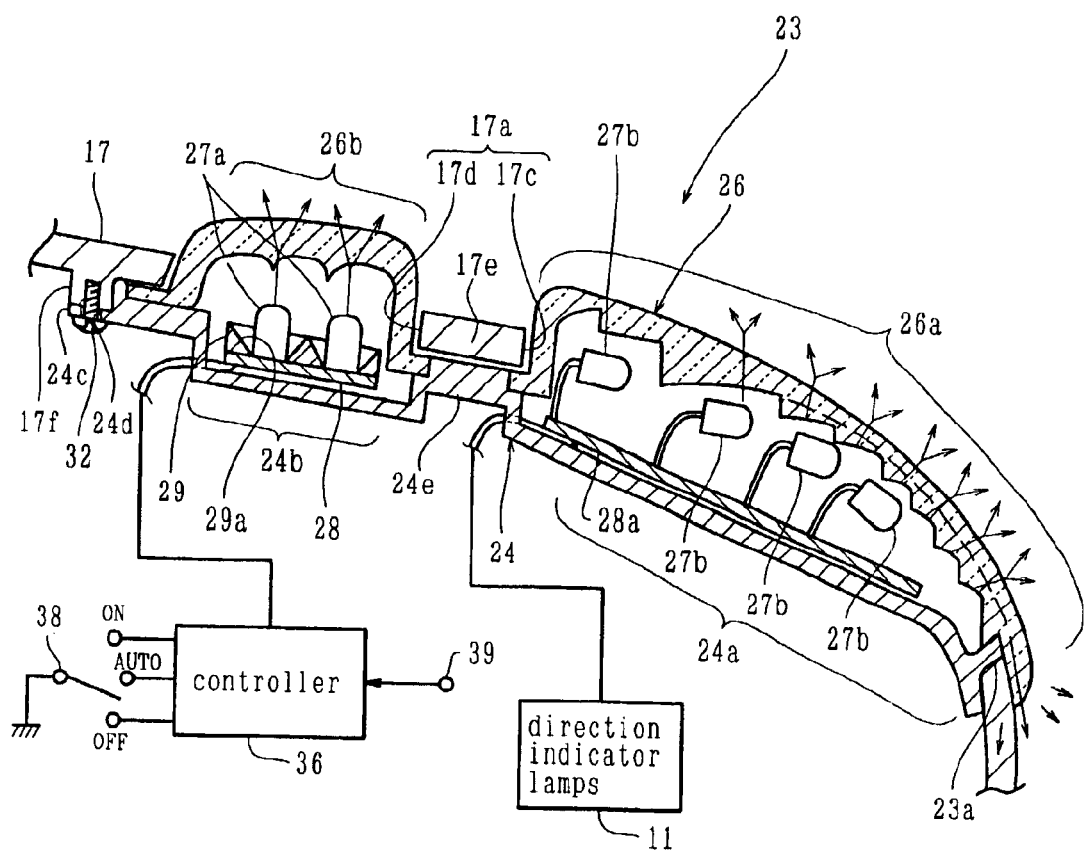
FIG. 6 is a cross sectional view of the side mirror body of the invention taken along the line C—C in FIG. 8.
Figure 7:
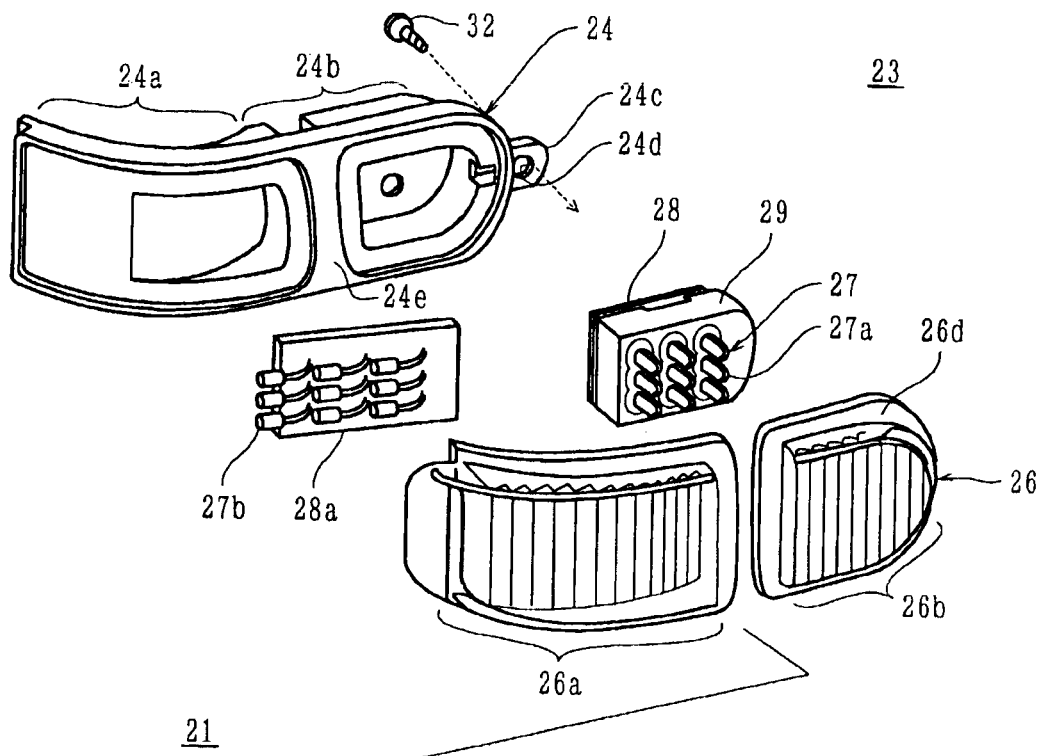
FIG. 7 is an exploded perspective view of the side mirror body.
Figure 7:
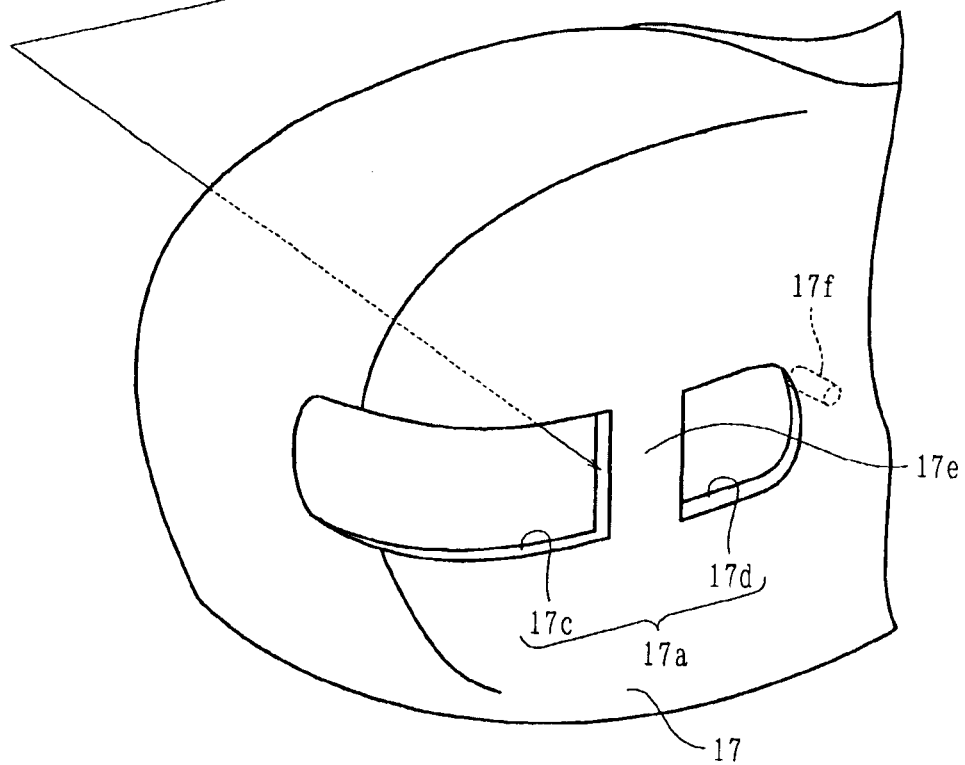
Figure 8:
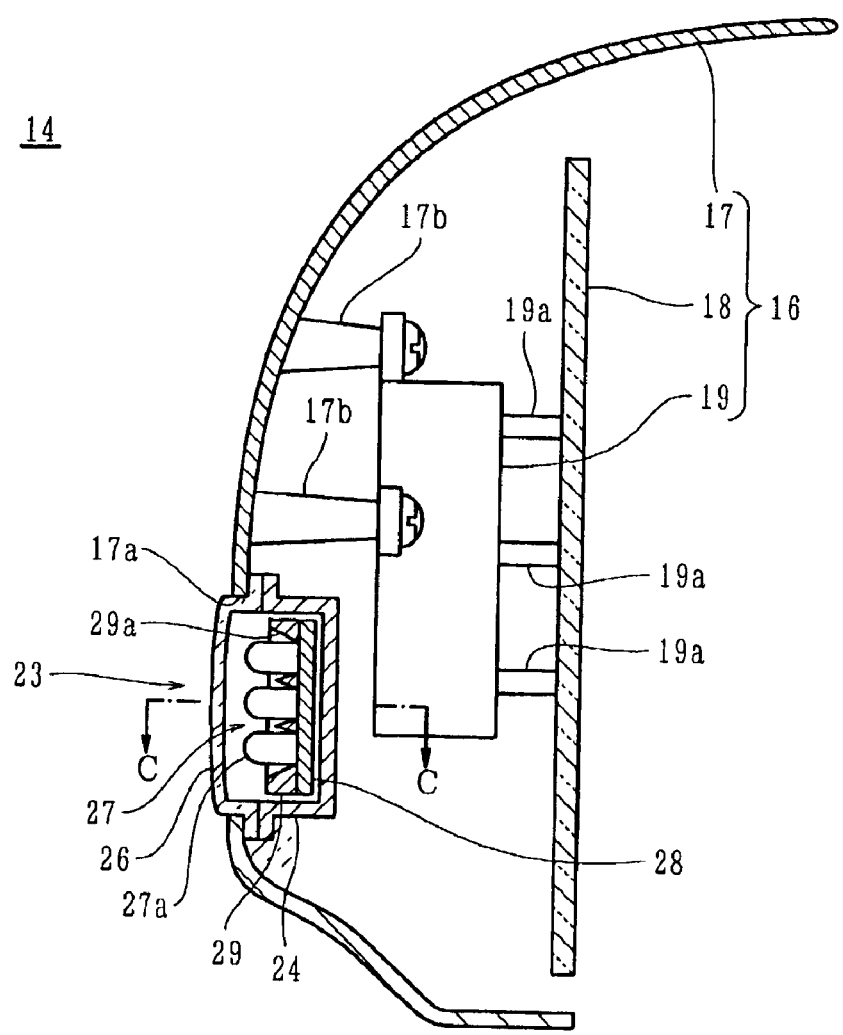
FIG. 8 is a cross sectional view corresponding to FIG. 3 showing a cross section of the vehicle side mirror using the side mirror body.

Referring now to FIG. 6 to FIG. 8, another embodiment of the present invention will be described.

As shown in the figures, the side mirror body 16 is constituted by a through hole 17a, formed on the mirror plate covering member 17, into which the side mirror lamp 23 is fitted. In this case, it is necessary to form the through hole 17a at the location where the side mirror lamp 23 and the tilting device 19 do not interfere with each other. Therefore, in order to avoid such an interference, a plurality of columns 17b for supporting the tilting device 19 on the mirror plate covering member 17 are formed integrally with the interior of the mirror plate covering member 17, and the tilting device 19 is supported by the plurality of columns 17b. The side mirror body 16 is applied to a vehicle side mirror, which does not employ the side mirror cover.

As shown in FIG. 6 and FIG. 7, the through hole 17a comprises a first through hole 17c and a second through hole 17d formed side by side along the width of the vehicle. In other words, a partitioning section 17e is formed between the first through hole 17c and the second through hole 17d. The lamp housing 24 comprises the curved first housing section 24a for closing up the first through hole 17c positioned at the widthwise extremity of the vehicle and the second housing portion 24b formed continuously from the first housing section 24a for closing up the second through hole 17d, and a diaphragm 24e for clearly differentiating the first housing section 24a and the second housing section 24b is formed. The lamp cover 26 comprises the first cover section 26a facing the first housing section 24a and the second cover section 26b formed separately from the first cover section 26a and facing the second housing section 24b. The plurality of light emitting elements 27 comprises one or more first LED or LEDs 27a provided in the second housing section 24b for emitting light toward the front of the vehicle, and one or more second LED or LEDs 27b provided in the first housing section 24a for emitting light toward the side of the vehicle.

The first LED 27a of this embodiment is mounted on the base plate, which corresponds to the support 28, and stored in the lamp housing 24. The support 28 is provided with the first reflector 29 on the surface facing the lamp cover 26. The first reflector 29 is identical with the one in the embodiment described previously, and thus repetitive description will not be made. On the other hand, the second LED 27b is mounted on the auxiliary plate 28a, and the auxiliary plate 28a is stored in the first housing section 24a of the lamp housing 24. Accordingly, the second LED 27b is provided in the first housing section 24a so as to emit light toward the side of the vehicle.

The second cover section 26b of the lamp cover 26 is formed with concavities and convexities on the inner surface thereof, and the light emitted from the first LED 27a is refracted on the concavities and convexities formed on the inner surface of the second cover section 26b, passes through the second cover section 26b, and is emitted from the second cover section toward the front of the vehicle. On the other hand, the first cover section 26a of the lamp cover 26 is formed with concavities and convexities on the inner surface thereof parallel with the vertical direction continuously in the direction of the width of the vehicle. The light emitted from the second LED 27b is reflected on the concavities and convexities formed on the inner surface of the first cover section 26a and, from the first cover section, emitted toward the front and the side of the vehicle, and part of the light is emitted from the outer end of the first cover section 26a toward the rear of the vehicle.

The side mirror lamp 23 is fabricated by adhering the peripheral edge of the lamp cover 26 to the peripheral edge of the lamp housing 24 having the plurality of light emitting elements 27 as described above with an adhesive agent, and the outer end of the first housing section 24a and the outer end of the first cover section 26a cooperatively form the recessed groove 23a which can be fitted on the peripheral edge of the first through hole 17c on the far side of the vehicle in an adhered state. The peripheral edges of the first cover section 26a except for the portion on the far side of the vehicle and the peripheral edge of the second cover section 26b are formed with the flange 26d. On the other hand, the inner end of the second housing section 24b is formed with the flange 24c having the mounting hole 24d. A boss 17f is formed on the peripheral edge of the second through hole 17d on the side closer to the vehicle. The side mirror lamp 23 is attached to the mirror plate cover member 17 by fitting the recessed groove 23a on the peripheral edge of the first through hole 17c on the side far from the vehicle, covering the flange 26d with the mirror plate covering member 17, and in this state, inserting the screw 32 through the mounting hole 24d, and screwing into the boss 17f.

The second LED 27b of the side mirror lamp 23 is electrically connected to the direction indicator lamp 11 of the vehicle 10. In other words, the lead that is not shown in the figure and connected to the second LED 27b at one end thereof is wired in the interior of the vehicle 10 and is connected to the lead that supplies power to the direction indicator lamps 11 of the vehicle 10 at the other end. Accordingly, when a power is supplied and the direction indicator lamp 11 is flickered, the lead, not shown, is also supplied with power, and thus the plurality of light emitting elements 27 are flickered.

On the other hand, the first LED 27a of the side mirror lamp 23 functions as a position lamp or as a daytime lamp. In other words, a control output of the controller 36 is connected to the first LED 27a. The controller 36 is provided with the control switch 38, and a detected output of the vehicle speed sensor 39 of the vehicle is connected thereto.

In the vehicle side mirror 14 constructed as described above, when a driver of the vehicle 10 in FIG. 4 flickers the direction indicator lamp 11 before he or she turns the vehicle, the second LED 27b of the side mirror lamp 23 of the side mirror 14, which is electrically connected to the direction indicator lamp 11 and positioned at the outer most position of the vehicle 10, flickers. The light emitted from the second LED 27b is emitted from the first cover section toward the front and the side of the vehicle. Therefore, third parties walking on the street on the side of the vehicle or the drivers of vehicles approaching the relevant vehicle from the side of the junction can recognize the turning direction of the relevant vehicle, and third parties walking on the street behind the vehicle or the drivers of vehicles approaching the relevant vehicle from behind can also recognize the turning direction of the vehicle. Consequently, the drivers of the vehicles and the third parties on the street can effectively avoid contact with the vehicle 10, thereby ensuring a sufficient safety.

On the other hand, when the control switch 38 is switched to the ON terminal or to the AUTO terminal, the controller 36 turns on the first LED 27a of the side mirror lamp 23 of the side mirror 14 constantly or during traveling. The light emitted from the first LED 27a is reflected directly or via the first reflector 29, refracted by the concavities and convexities formed on the inner surface of the second cover section 26b of the lamp cover 26, passes through the second cover section 26b, and is emitted from the second cover section toward the front of the vehicle. Accordingly, the light emitted from the first LED 27a functions as a position lamp at night, and as a so-called daytime lamp in the daytime, so that oncoming vehicles approaching from the front of the vehicle can recognize the existence of the relevant vehicle. In addition, the decorative effect on the vehicle may be enhanced. When the control switch 38 is switched to the AUTO terminal, the controller 36 turns off the first LED 27a when the vehicle is stopped, and reduces the quantity of power consumption. By turning the control switch 38 to the OFF terminal, the first LED 27a may be constantly turned off at the driver's desire.

Though the case where the lamp cover 26 is adhered to the lamp housing 24 while covering the plurality of light emitting elements 27 is shown in the embodiment described above, it is also possible to mount the lamp cover 26 to the mirror plate covering member 17 or to the mirror cover body 22, and to adhere the lamp housing to the lamp cover 26.

As described thus far, according to the present invention, the through hole comprise the outer first through hole and the inner second through hole, which are formed so as to align side by side along the width of the vehicle, the lamp housing comprise the curved first housing section for closing up the first through hole and the second housing section for closing up the second through hole, the lamp cover comprise the first cover section facing the first housing section and the second cover section formed continuously from the first cover section so as to face the second housing section, and the plurality of light emitting elements comprise one or more first LED or LEDs provided in the second housing section for emitting light toward the front of the vehicle and one or more second LED or LEDs provided in the first housing section for emitting light toward the side of the vehicle. Therefore, the light emitted from the first LED passes through the second cover section of the lamp cover, and is emitted toward the front of the vehicle, and the light emitted from the second LED passes through the first cover section, and is emitted toward the front, side and rear of the vehicle. Therefore, for example, it is possible to connect the second LED to the direction indicator lamp and use the first LED as a position lamp. In this case, since the first LED and the second LED are provided in the through holes formed separately, the illumination of one of the first LED and the second LED cannot be confused with the illumination of the other one of those, and thus the function as a direction indicator lamp and the function as a position lamp or as a daytime lamp can clearly be differentiated.

By forming the recessed groove that is capable of being fitted on the peripheral edge of the through hole on the side far from the vehicle on the outer end of the side mirror lamp, forming the flange having the mounting hole on the inner end of the second housing section, and forming the boss on the peripheral edge of the through hole on the side closer to the vehicle of the mirror cover body or the mirror plate covering member, the side mirror lamp can be mounted to the mirror cover body or the mirror plate covering member by a relatively simple procedure including the steps of fitting the recessed groove on the peripheral edge of the through hole on the side far from the vehicle and, in this state, screwing the screw inserted through the mounting hole into the boss. In addition, vicious removal of the side mirror lamp from the mirror cover body or from the mirror plate covering member can effectively prevented.

What is claimed is:

1. A side mirror cover comprising: a mirror cover body (22) for covering the front surface of a side mirror body (16) of a vehicle (10) and including a through hole (22b) having an outer end at the position corresponding to the widthwise extremity of the vehicle (10); and a side mirror lamp (23) fitted into the through hole (22b) from the backside of the mirror cover body (22);

wherein the side mirror lamp (23) comprises: a lamp housing (24) fitted along the peripheral edge of the through hole (22b) formed on the mirror cover body (22) so as to close up the through hole (22b) and provided with a plurality of light emitting elements (27); and a translucent lamp cover (26) fitted to either one or both of the lamp housing (24) and the mirror cover body (22) so as to cover the plurality of light emitting elements (27), wherein the through hole (22b) is formed by a first through hole (22d) and a second through hole (22e), wherein the lamp housing (24) comprises: a first housing section (24a) for closing up the first through hole (22d); and a second housing section (24b) for closing up the second through hole (22e), wherein the lamp cover (26) comprises: a first cover section (26a) facing the first housing section (24a); and a second cover section (26b) facing the second housing section (24b), and wherein the plurality of light emitting elements (27) include: one or more first LED or LEDs (27a) provided in the second housing section (24b); and one or more second LED or LEDs (27b) provided in the first housing section (24a).

2. A side mirror cover according to claim 1, wherein the first through hole (22d) is formed on a side of the mirror body most distant from the vehicle and the second through hole (22e) is formed on a side of the mirror body closest to the vehicle, wherein the first housing section (24a) and the first cover section (26a) are formed respectively into curved shapes, wherein the first LED (27a) is provided in the second housing section (24b) so as to emit light toward the front of the vehicle (10), and wherein the second LED (27b) is provided in the first housing section (24a) so as to emit light toward the side of the vehicle (10).

3. A side mirror cover according to claim 2, wherein the side mirror lamp (23) is fabricated by adhering a peripheral edge of the lamp cover (26) to a peripheral edge of the lamp housing (24), which has a recessed groove (23a) defined by an outer end of the first housing section (24a) and an outer end of the first cover section (26a) in the adhered state, and which is capable of being fitted on the peripheral edge of the first through hole (22d) on the side far from the vehicle (10), and is formed with a flange (24c) having a mounting hole (24d) at the inner end of the second housing section (24b), wherein the mirror cover body (22) is formed with a boss (22c) at the peripheral edge of the second through hole (22e) on the side closer to the vehicle (10), and the side mirror lamp (23) is mounted on the mirror cover body (22) by fitting the recessed groove (23a) onto the peripheral edge of the first through hole (22d) on the side distant from the vehicle (10), passing a screw (32) through the mounting hole (24d), and screwing the same into the boss (22c).

4. A side mirror cover according to claim 2, wherein the first LED (27a) is a position lamp or a daytime lamp, and the second LED (27b) is a direction indicator lamp.

5. A side mirror cover according to claim 2, wherein the first cover section (26a) is formed with concavities and convexities on the inner surface thereof, so that light emitted from the second LED (27b) is scattered and directed toward the front, the side, and the rear of the vehicle.

6. A side mirror body comprising: a mirror plate (18), a mirror plate covering member (17) formed so as to cover the mirror plate (18), with the inner extremity attached to the front of an opening on a door of the vehicle (10) for accommodating side window glass at an end thereof, and provided with a through hole (17a) having the outer end positioned at the widthwise end thereof, and a side mirror lamp (23) mounted from the backside of the mirror plate covering member (17) into the through hole (17a), wherein the side mirror lamp (23) comprises: a lamp housing (24) fitted along the peripheral edge of the through hole (17a) formed on the mirror plate covering member (17) so as to close up the through hole (17a) and provided with a plurality of light emitting elements (27), and a translucent lamp cover (26) mounted on either one or both of the lamp housing (24) and the mirror plate covering member (17) so as to cover the plurality of light emitting elements (27), wherein the through hole (17a) comprises a first through hole (17c) and a second through hole (17d), wherein the lamp housing (24) comprises a first housing section (24a) for closing up the first through hole (17c) and a second housing section (24b) for closing up the second through hole (17d), wherein the lamp cover (26) comprises a first cover section (26a) facing the first housing section (24a) and a second cover section (26b) facing the second housing section (24b), and wherein the plurality of light emitting elements (27) comprises one or more first LED or LEDs (27a) provided in the second housing section (24b) and one or more second LED or LEDs (27b) provided in the first housing section (24a).

7. A side mirror body according to claim 6, wherein the first through hole (17c) is formed on the side far from the vehicle and the second through hole (17d) is formed on the side closer to the vehicle, wherein the first housing section (24a) and the first cover section (26a) are formed respectively into curved shapes, wherein the first LED (27a) is provided in the second housing section (24b) so as to emit light toward the front of the vehicle (10), and wherein the second LED (27b) is provided in the first housing section (24a) so as to emit light toward the side of the vehicle (10).

8. A side mirror body according to claim 7, wherein the side mirror lamp (23) is fabricated by adhering the peripheral edge of the lamp cover (26) to the peripheral edge of the lamp housing (24), is formed with a recessed groove (23a) defined by the outer end of the first housing section (24a) and the outer end of the first cover section (26a) in the adhered state, which is capable of being fitted on the peripheral edge of the first through hole (17c) on the side far from the vehicle (10), and is formed with a flange (24c) having a mounting hole (24d) at the inner end of the second housing section (24b), wherein a boss (17f) is formed at the peripheral edge of the second through hole (17d) on the side closer to the vehicle (10), and the side mirror lamp (23) is mounted on the mirror plate covering member (17) by fitting the recessed groove (23a) onto the peripheral edge of the first through hole (17c) on the side far from the vehicle (10), passing a screw (32) through the mounting hole (24d), and screwing the same into the boss (17f).

9. A side mirror body according to claim 7, wherein the first LED (27a) is a position lamp or a daytime lamp, and the second LED (27b) is a direction indicator lamp.

10. A side mirror body according to claim 7, wherein the first covering section (26a) is formed with concavities and convexities on the inner surface thereof, so that light emitted from the second LED (27b) is scattered and directed toward the front, the side, and the rear of the vehicle.

* * * * *